United States Patent [19]

Cleveland

[11] 4,025,462
[45] May 24, 1977

[54] CERAMIC CELLULAR STRUCTURE HAVING HIGH CELL DENSITY AND CATALYST LAYER

[75] Inventor: Joseph J. Cleveland, Wysox, Pa.

[73] Assignee: GTE Sylvania Incorporated, Stamford, Conn.

[22] Filed: Oct. 31, 1975

[21] Appl. No.: 627,536

Related U.S. Application Data

[60] Division of Ser. No. 455,193, March 27, 1974, Pat. No. 3,943,994, which is a continuation-in-part of Ser. No. 313,101, Dec. 7, 1972, abandoned.

[52] U.S. Cl. .................... 252/477 R; 23/288 F; 165/166; 264/56; 264/59; 264/63; 428/182; 428/184; 428/186
[51] Int. Cl.² ............... F28D 17/00; B32B 3/28
[58] Field of Search ............ 252/477 R; 428/178, 428/182, 184; 106/39.5; 23/288 F, 288 FC; 165/10, 184, 4.8, 165, 177, 166; 264/56, 58, 59, 63

[56] References Cited

UNITED STATES PATENTS

| | | | |
|---|---|---|---|
| 3,112,184 | 11/1963 | Hollenbach | 264/63 |
| 3,320,044 | 5/1967 | Cole et al. | 264/63 |
| 3,444,925 | 5/1969 | Johnson | 165/166 |
| 3,502,596 | 3/1970 | Sowards | 106/39.5 |
| 3,717,487 | 2/1973 | Hurley et al. | 264/63 |
| 3,794,707 | 2/1974 | O'Neill et al. | 264/63 |

*Primary Examiner*—George F. Lesmes
*Assistant Examiner*—P. Thibodeau
*Attorney, Agent, or Firm*—Norman J. O'Malley; John C. Fox; Donald R. Castle

[57] ABSTRACT

A ceramic cellular structure having a cell density of up to 1600 cells per square inch and wall thicknesses down to 2 mils is produced by a process which comprises: (1) forming a slurry consisting essentially of finely divided sinterable solid particles of ceramic raw materials and a controlled amount of a plastic supporting matrix containing thermoplastic resin, a thermosetting resin, a plasticizer, an organic solvent and a small amount of a deflocculant; (2) ball milling the slurry; (3) casting the slurry in the form of a film; (4) removing the solvent to produce a self-supporting green ceramic tape; (6) molding a portion of the tape to form a corrugated first member; (7) providing another portion of the tape to form a substantially flat second member; (8) forming a first bilayer by bonding the second member to the nodes of the first member; (9) mutually bonding a predetermined number of bilayers substantially identical to the first bilayer to form a cellular green structure of a desired shape; and (10) firing the green structure at a temperature sufficient to form a sinter-welded polycrystalline ceramic structure. The fired structures, after being subjected to various finishing operations, are useful as rotary heat regenerators, stationary heat recuperators and catalyst supports.

1 Claim, 5 Drawing Figures

U.S. Patent      May 24, 1977      4,025,462

CERAMIC CELLULAR STRUCTURE HAVING HIGH CELL DENSITY AND CATALYST LAYER

CROSS-REFERENCE TO RELATED APPLICATIONS

This application is a division of copending application Ser. No. 455,193 filed Mar. 27, 1974 and assigned to the assignee of the present invention. Ser. No. 455,193 now U.S. Pat. No. 3,943,994, issued Mar. 16, 1976, is a continuation-in-part of Ser. No. 313,101 filed Dec. 7, 1972 and now abandoned.

BACKGROUND OF THE INVENTION

This invention relates to ceramic celluar structures and more particularly relates to such structures having a high cell density per unit area and to a method for producing such structures and furthermore relates to the use of such structures regardless of cell density as heat exchangers and catalyst supports.

The attractiveness of ceramics as materials for cellular structures to support catalyst materials and to act as heat exchangers is widely recognized. For example, the heat exchanger is an integral part of gas turbine engine designs. The purpose of the heat exchanger is to recover waste heat losses and to preheat the incoming air in order to improve the efficiency of engine operation. The level of both fuel consumption, and noxious exhaust emissions are expected to be significantly lower than for conventional internal combustion engines. In one design, the heat exchanger is a slowly rotating device, (regenerator), heated by hot exhaust gases on one side and giving up this heat during rotation to the incoming cool gases on the other side. In another design the heat exchanger is stationary (recuperator), and hot and cold gases are passed through alternate layers. Whether in the form of a rotary regenerator or a stationary recuperator ceramic heat exchangers have the advantage of high termperature capability which has a direct effect on engine efficiency. Ceramics are also lighter in weight than metals and have the potential for lower cost.

A major disadvantage of ceramics is the difficulty inherent in forming them, due in large part to their low strength in the green, unfired state and to their brittleness in the fired state. The problem becomes more acute as surface area and size requirements for these structures increase, requiring decreased cell wall thicknesses and increased bulk weight.

One approach to solving such forming problems has been to cast a ceramic film from a slurry onto a fugitive support material to form a bilayered tape, mold the bilayered tape into a corrugated member, form the tape into the desired structure (for example, by rolling or stacking with interposing flat members) and fire to volatilize the support medium and sinter-weld the structure.

This technique of utilizing a fugitive support material to provide needed strength during forming imposes an upper limit on cell density due to the space occupied by the support layer in the structure prior to firing. In addition, where the wall thickness is small compared to the support thickness, substantial contact of the nodes of the corrugated layer may be prevented (particularly in a rolled structure) resulting in formation of few sinter welds during firing and consequent low mechanical strength of the finished structure.

In a similar approach the support is of a material such as aluminum which upon firing converts to the oxide and thus becomes an integral part of the structure. Unfortunately, such an approach seriously limits the compositional choices of the ceramic particularly in high temperature applications where the thermal expansion coefficient of the structure is of critical importance. In gas turbine applications, for example, where the ceramic heat exchanger would be subjected to severe thermal shocks, both the ceramic and the support material would have to exhibit high thermal shock resistance and thus high thermal expansion compatibility.

While U.S. Pat. No. 3,444,925 does describe a technique for fabricating such cellular structures whereby use of the support material is optional, the structure described having the highest cell density (about 500 cells per square inch) was achieved with an aluminum foil support.

It is therefore felt that a ceramic based composition which can be processed to maintain sufficient flexibility in the green state to be molded in small thicknesses, yet retain sufficient green strength to maintain its molded shape prior to firing without the need of a substrative support material and which would thus enable the fabrication of high cell density cellular structures would be an advancement in the art.

SUMMARY OF THE INVENTION

In accordance with the invention, ceramic cellular structures having cell densities of up to 1600 per square inch of cross-sectional area and wall thicknesses down to 2 mils and particularly suitable for use as heat exchangers and catalyst supports are produced by a method comprising: (a) providing a self supporting green ceramic tape consisting essentially of finely divided sinterable or fusible solid particles of ceramic raw materials substantially uniformly distributed throughout a fugitive plastic supporting matrix. For purposes of the invention, ceramic raw materials are meant to include such materials partially or completely substituted by devitrifiable glassy materials. The weight ratio of the supporting matrix to the ceramic raw materials should be from about 1:3 to about 1:6, the supporting matrix consisting essentially of from about 28.5 to about 74.5 weight percent of a two resin binder system consisting essentially of a thermoplastic resin and a thermosetting resin, from about 25 to 70 weight percent of a plasticizer and from about 0.5 to about 1.5 weight percent of a deflocculating agent; (b) molding the tape to form a corrugated first member; (c) adhering a substantially flat second member of the tape to one side of the first member to form a first bilayer; (d) adhering a predetermined number of subsequent bilayers substantially identical to said first bilayer to form a cellular structure having alternate first and second members; and (e) sintering the green cellular structure to convert the ceramic particles to a unitary ceramic body and to sinter-weld the various members to each other. Sintering may be carried out immediately after forming or after a delay such as would be occasioned by shipping or storage.

In another aspect of the invention the self-supporting tape is provided by preparing a slurry which can be cast into the tape. A liquid solvent is added to the plastic matrix material to provide a solution for casting. The solvent may be a single solvent or mixture of solvents, such as a volatile aromatic such as toluene and a volatile alcohol such as methanol, preferably from 2:1 to 4:1 volumetric ratio of aromatic to alcohol. The amount of solvent that is added depends upon the other materials. However, an amount of solvent is added which imparts a viscosity to the slurry which enables it to be cast in the form of a tape. Amounts of solvent of from about 75 percent to about 120 percent by weight of the other ingredients including the ceramic raw material and support matrix are used to impart the foregoing desired viscosities. The slurry is ball milled to obtain proper distribution of ingredients, cast to form a tape of desired thickness, and the solvent evaporated under controlled conditions to form the self-supporting green ceramic tape.

DETAILED DESCRIPTION OF THE INVENTION

Figure 1:
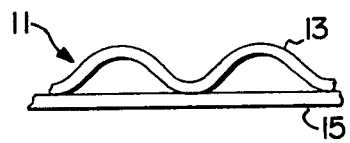

For a better understanding of the present invention, together with other and further objects, advantages and capabilities thereof, reference is made to the following disclosure and appended claims in connection with the above description of some of the aspects of the invention.

Essentially any ceramic or glass raw material particles are useful in the practice of this invention which will sinter or sinter and devitrify to form a ceramic body when heated to conventional firing temperatures. Solid oxides such as aluminum oxide, rare earth oxides, refractory metal oxides, zirconium oxides and silicon oxides can be used. Ceramic materials other than oxides such as silicon nitride, silicon carbide, Sialons (a series of compounds resulting from partial substitution of Al for Si and O for N in $B-Si_3N_4$), rare earth metal silicates, and zirconium spinel can be used. However, in view of the applications envisioned for the final ceramic cellular structures, ceramic materials exhibiting low positive, zero or negative coefficients of thermal expansion in their fired state are preferred for use in the practice of the invention. Such preferred materials include but are not limited to lithium aluminum silicates, magnesium aluminum silicates, lithium-magnesium aluminum silicates, aluminum silicates, mullite, cordierite, magnesium titanate, aluminum titanate and fused silica.

If desired, various minor amounts (generally one-half percent by weight or less) of various additives such as grain growth inhibitors may be incorporated into the ceramic raw material as is known in the art. For example, magnesium oxide has long been known as an effective grain growth inhibitor for aluminum oxide. Some rare earth oxides are also known to be effective grain growth inhibitors for various ceramic materials.

Depending upon beginning particles size and the desired tape cast thickness the raw materials may have to be milled to reduce particle size. For example, for a tape thickness of 2 mils the particle size should not exceed about 50 microns.

As used herein, the art-accepted term "green tape" refers to a tape in its unfired state which upon being heated to ceramic-forming temperatures, generally in the range of from about 1300° to 1900° C, is converted to a unitary ceramic body of polycrystalline or mixed polycrystalline and glassy structure by the volatilization of the support matrix and sintering or fusing together of the ceramic raw material particles.

While it is a particular advantage of the invention that self-supporting structures in the green state can be fabricated from relatively thin tapes, that is, tapes which upon firing will result in a ceramic film having a thickness as low as about 2 mils, larger thicknesses are required for some uses, and structures having wall thicknesses up to 30 mils can readily be produced by this method. Thicker walled structures can also be produced. However, these can be achieved by more conventional ceramic processing techniques such as extrusion, pressure molding and the like. The problem of providing self-supporting structures in an unfired state is not as acute as it is when walls in the 2 to 30 mil thickness range are desired.

The green tape consists essentially of the raw material, a thermoplastic resin, a thermosetting resin and a compatible plasticizer and may additionally contain a deflocculating agent to aid in dispersion of the particles during formation of a casting slip to be described herein.

The proper ration of thermosetting resin to thermoplastic resin and of these resins to plasticizer is critical to the successful practice of the invention since to a great extent upon these ratios depend the attainment of the needed combination of flexibility and strength of the green tape.

The thermoplastic resin may be of the cellulose type or vinyl type. Cellulose resins can be of the Cellulose propionate and Cellulose acetate butrate type or of the Cellulose acetate and Cellulose Nitrate type. These are sold by their generic names by suppliers such as Hercules Incorporated, Eastman Chemical Products and Celanese Plastics Company. One resin which has been found to be particularly suitable is polyvinyl butyryl sold under a variety of trade names by different suppliers such as Butvar by Shawinigan Resins, Saflex by Monsanto Company and Butacite by E. I. Dupont. The thermosetting resin may be an amine type such as urea-formaldehyde or melamine-formaldehyde available from various suppliers under tradenames such as Beckamine from Reichold Chemical Company, Beetle from American Cyanamid, or Uformite from Rohm & Haas Company. The thermosetting resin should be present in the amount of at least 5 to about 50 weight percent base upon total weight of thermoplastic and thermosetting resins. The preferred range is 10 to 35 weight percent.

A major ingredient of the supporting matrix is a plasticizer for the resin. Alkyl and dialkyl phthalate plasticizers have been found to provide the proper flexibility to the supporting matrix while retaining suitable strength. Particularly suitable plasticizers are the dialkyl phthalates such as dioctylphthalate, diethyl phthalate, dibutyl phthalate, diamyl phthalate and the like. In general it has been found that a resin to plasticizer weight ratio of between about 3:1 and 1:2 respectively is satisfactory. Thus, the supporting matrix contains between about 30 and about 80 percent by weight of resin which matrix constitutes from about 16 to about 31 percent by weight of the green tape.

In the formation of a slurry which can be cast in the form of a tape, a solvent for the resin and the plasticizer is used to achieve a castable viscosity using the doctor blade technique. A two component solvent which contains a aromatic solvent such as toluene and an alcohol such as methanol may be used in those cases in which optimum binder solubility is desired. These two solvents are generally used in a volumetric ratio of aromatic to alcohol of from about 4:1 to about 2:1. Generally the alcohols that are used are the lower alkyl alcohols and preferably methanol and ethanol. The aromatics that are preferred are substituted benezene compounds such as toluene and xylene. Other solvents can be used provided they will dissolve the resins and plasticizer to form a castable slurry and will evaporate at relatively low temperatures. The solvent is generally used in amounts of from about 75 to 120 percent by weight based on the total weight of the ceramic raw materials and the supporting matrix.

In order to prevent flocculation or agglomeration of the finely divided ceramic raw materials which may initially be below 50 microns in size a deflocculating agent is used generally in amounts of from 0.5 to 1.5 weight percent of the slurry. Most deflocculating agents are organics, such as gelatin, fish oil and the like. To assure a uniform dispersion of both the resin, plasticizer and ceramic raw materials, the slurry ingredients should be blended, such as by ball milling, for a time sufficient to insure uniform distribution of ingredients, and uniform coating of the ceramic particles, preferably in a ball mill which will not contaminate the tape making ingredients. Milling time depends upon mill size. For example, 8 to 10 hours may be sufficient in a 40 gallon mill, while 24 hours may be required in a 1 or 2 gallon mill. After the uniform slurry has been prepared, the slurry is cast into a tape using a doctor blade. The blade is adjusted to give a desired thickness of tape.

After the tape is cast, the solvent is evaporated. Although in many instances evaporation will occur under atmospheric temperature, heating to a temperature below the volatilization temperature of the solvent appreciably reduces the time of fabrication. Generally a temperature between about 40° and 70° C is used. It is important, however, that the temperature not reach that at which the solvent boils, since that would result in the formation of bubbles in the tape.

The self supporting ceramic tapes now in the green state are used to form the high cell density ceramic cellular structures of the invention. These structures may be formed by molding, crimping or multiple folding of tape members to form a corrugated pattern which in cross section presents a repeating pattern. Examples of corrugated patterns which are suitable include triangular, rectangular, square and sinusoidal. The corrugated tape members are then alternated with flat tape members to build up a cellular structure that has a multitude of air containing cells of predetermined size and shape, each such cell being defined by walls of the ceramic tape members. In a preferred embodiment such structures are build up by first adhering a first corrugated member and a second flat member to form a bilayered tape member and subsequently forming this bilayered tape member into the desired configuration.

In order to more fully illustrate the preferred structures produced from such bilayered tapes, reference is now had to the drawing and in particular to FIG. 1 which illustrates in cross section a bilayered tape comprising corrugated member 1 and flat 2. The first or molded member and the second or flat member can be adhered together by several methods. Once such method is to use a solvent that will partially dissolve the resins in the tape and thus enable the nodes of the molded member to adhere to the flat member. Another method is to use a fugitive gluing media which will wet the appropriate surfaces of each member and upon drying will cement the surfaces together. Additionally, if certain plasticizers are used, application of heat to the appropriate points of contact can cause the areas of contact to fuse together thus providing adherence of the surfaces. However, such heat application should be compatible with the maintainance of adequate flexibility for subsequent forming, as described above.

Figure 2:
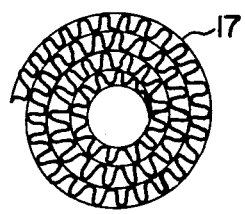
Figure 2A:
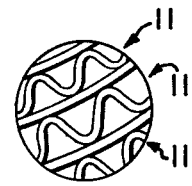

Referring now to FIGS. 2 and 2A; there is shown a ceramic cellular structure which has been formed by the spiral winding of the bilayered tape of FIG. 1. Such a structure, when fabrication has been completed, is particularly suitable for use as a rotary heat regenerator in a gas turbine engine which alternately exposes the heat transfer matrix to hot and cold gas streams.

Figure 3:
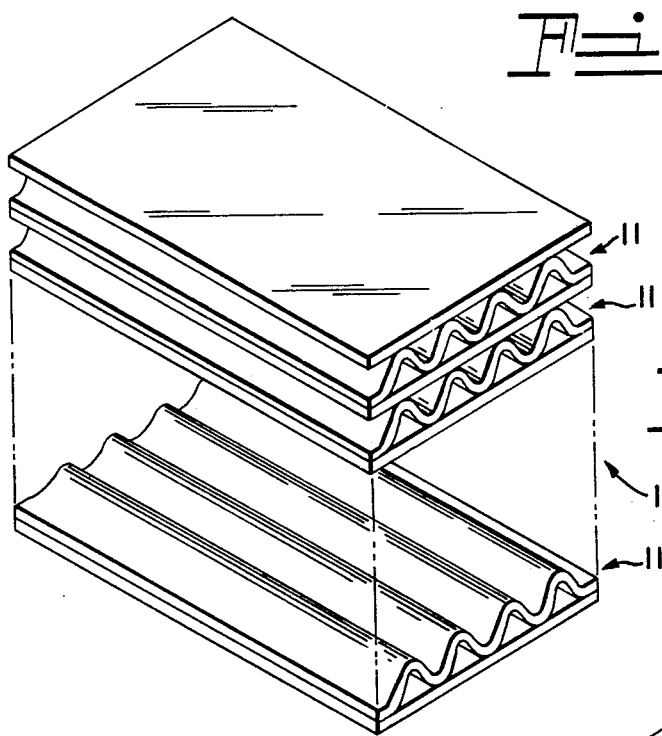

FIG. 3 represents a rectangular block cellular structure which has been built up by stacking of sheets of the bilayered tape of FIG. 1 and which is suitable for use as a stationary counterflow heat recuperator when manifolded to pass hot and cold gases through alternate layers of the cells formed by the bilayered tapes. Alternatively, when coated with a suitable catalyst the structure can act as a catalytic converter, for example, for auto exhaust emission control.

Figure 4:
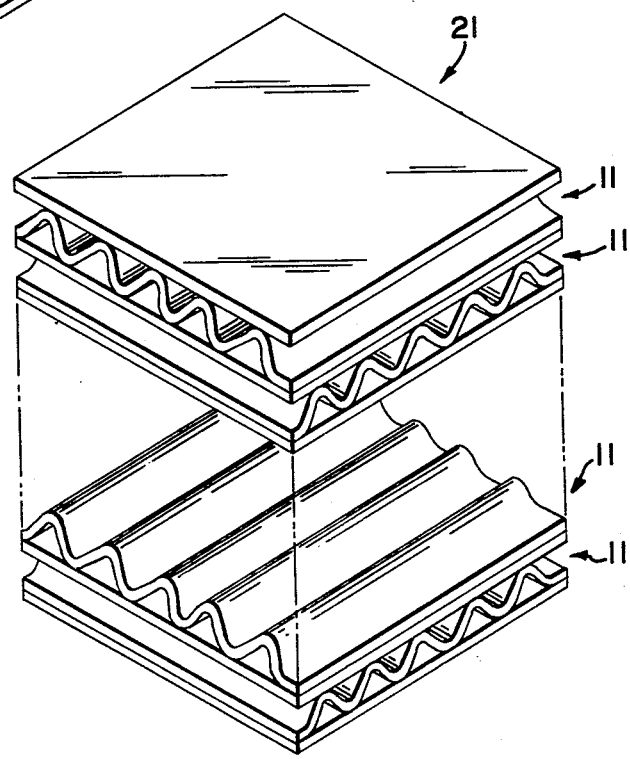

FIG. 4 represents a structure which is similar to that of FIG. 3 except that the longitudinal axes of the cells of successive layers are at right angles to each other. This structure is suitable for use as a stationary crossflow heat recuperator which passes hot and cold gases through alternate layers of the cells formed by the bilayered tapes. Each of the particles illustrated above has cells which pass through the structure from one face to the opposite face forming channel type cells completely through the body. These structures may be fired at suitable temperatures and for sufficient times to form unitary polycrystalline or mixed polycrystalline-glassy ceramic structures. Generally, temperatures of from about 1300° C to about 1900° C are maintained for at least about 4 hours to evolve the resins and plasticizer and to sinter the raw materials. The sintering times and temperatures will of course vary depending upon the ceramic composition and the desired physical properties. For example, for heat exchanger applications cordierite bodies are usually sintered at about 1325° C, zirconia and mullite at about 1400° C and yttrium silicate at about 1425° C for about 4 hours. In general, the thickness of the ceramic members is about 2 to about 6 mils and cell densities may range from about 500 up to as high as 1600 per square inch of cross sectional area of the cellular structure. These thicknesses and cell densities correspond to bulk densities of about 0.25 to 1.2 g/cc. As may be appreciated, high cell density structures may be particularly advantageous in the applications described, since the very high surface areas resulting could lead to more efficient operation as heat exchangers and catalytic converters. For example, for wall thickness of 2 mils, increasing the cell density from about 200 per square inch to 1600 per square inch increases the surface area per cubic inch of cellular structure from about 60 square inches to about 160 square inches.

After the ceramic structure is sintered, it may be subjected to various additional processing steps depending upon the particular application envisioned. For example, the catalyst support structure must be coated with a suitable conversion catalyst, usually in the form of a slurry containing a plasticizer, a resin and a solvent. A typical plasticizer for this purpose is ethyl cellulose. Dibutyl phthalate is a suitable resin and a mixture of glycol and butynol is a satisfactory solvent for the resin-plasticizer system. A dispersant or deflocculating agent can be used to achieve a good dispersion of the catalyst in the other components. If desired, acetone can be used to provide a slurry with the desired viscosity to obtain proper coating thickness. After coating, the coated structure is fired at a temperature of from about 600° to about 1000° C to obtain catalyst adherence, above which substantial reaction of the catalyst and the ceramic could occur. Normally, about 750° to 850° C is sufficient.

Other operations applicable to any of the above structures may include sealing of the outer or peripheral cells to form an air tight seal or various finish grinding operations to achieve shaping or accurate sizing of the structures.

To more fully illustrate the subject invention, the following detailed example is presented. All parts, proportions and percentages are by weight unless otherwise indicated.

EXAMPLE

A mixture is formed containing the following amounts of raw materials by weight - about 47 parts ceramic powder having a cordierite composition ($2MgO.2Al_2O_3.5SiO_2$) about 12 parts of resin. A (polyvinly butyral), about 5 parts of resin B (urea formaldehyde) about 6 parts of dioctyl phthalate plasticizer, about 23 parts toluene solvent, about 6 parts methanol solvent and about 1 part menhaden fish oil as a dispersant. This mixture is ball milled using alumina balls and a mill lined with an organic plastic coating for 24 hours and cast on a mylar film using a doctor blade technique to give a dry tape thickness of about 2 mils. During casting some of the solvent evaporates in air and the remainder is removed by subjecting the tape to a 40° C to 70° C air flow for about 4 minutes at an air flow velocity of approximately 0.5 feet per second. The film is thereafter cut into the desired size, molded into the corrugated first member having an approximately sinusoidal pattern repeating about 400 times per linear inch. A bilayered tape is formed by contacting the nodes of the corrugated first member to a substantially flat second member, since in this condition, the members are substantially self-adherent. This bilayered tape is spiral wound around a central core to form an annular cylinder having a cell density of about 1600 cells per square inch, a diameter of about 28 inches, a thickness of about 3 inches, an absolute density of 2.5 grams per cubic centimeter and a bulk density of about 0.8 grams per cubic centimeter. This structure is then fired by heating at a rate of about 3° C per minute to about 200° C and held at 200° C for about 2 hours to remove the supporting matrix, and thereafter heated at about 3° C per minute to about 1325° C and held at 1325° C for about 1 hour to sinter the ceramic, and furnace cooled.

While there has been shown and described what are at present considered the preferred embodiments of the invention, it will be obvious to those skilled in the art that various changes and modifications may be made therein without departing from the scope of the invention as defined by the appended claims.

What is claimed is:

1. A cellular structure of green ceramic tape consisting essentially of finely divided sinterable solid particles of ceramic raw materials substantially uniformly distributed throughout a fugitive plastic supporting matrix, the cells of the structure being defined by alternate corrugated and flat ceramic tape members wherein said cells completely traverse the article from one face to the opposite face thereof, the weight ratio of said supporting matrix to said raw materials in said tape being from about 1:3 to about 1:6, said supporting matrix consisting essentially of from about 28.5 to about 74.5 weight percent of a two-part resin, the resin consisting essentially of polyvinyl butyral in the amount of from 50 to 95 weight percent, remainder an amine thermosetting resin selected from the group consisting of melamine formaldehyde and urea formaldehyde, and from about 25 to about 70 weight percent of a plasticizer selected from the group consisting of alkyl phthalate and dialkyl phthalate plasticizers and from about 0.5 to about 1.5 weight percent of a deflocculating agent, the structure bearing a surface layer containing a catalyst, the structure, after firing, defining a catalytic converter.

* * * * *